(12) United States Patent
Jin et al.

(10) Patent No.: US 7,680,457 B2
(45) Date of Patent: Mar. 16, 2010

(54) METHOD AND SYSTEM FOR COLLABORATED BEAMFORMING FOR REDUCING INTERFERENCE

(75) Inventors: Hang Jin, Plano, TX (US); John Grabner, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 919 days.

(21) Appl. No.: 11/439,689

(22) Filed: May 23, 2006

(65) Prior Publication Data

US 2007/0087694 A1    Apr. 19, 2007

Related U.S. Application Data

(60) Provisional application No. 60/727,661, filed on Oct. 18, 2005.

(51) Int. Cl.
*H04B 15/00* (2006.01)

(52) U.S. Cl. ...................... 455/63.1; 370/329

(58) Field of Classification Search ................ 455/63.1, 455/67.11, 67.13
See application file for complete search history.

(56) References Cited

U.S. PATENT DOCUMENTS

| | | | |
|---|---|---|---|
| 5,606,729 A * | 2/1997 | D'Amico et al. | 455/67.11 |
| 6,842,438 B1 * | 1/2005 | Benedict et al. | 455/67.13 |
| 2002/0061768 A1 | 5/2002 | Liang et al. | 455/561 |
| 2002/0126777 A1 | 9/2002 | Kasapi et al. | 375/346 |
| 2004/0081121 A1 | 4/2004 | Xu | 370/329 |

* cited by examiner

*Primary Examiner*—Matthew D. Anderson
*Assistant Examiner*—Gennadiy Tsvey

(57) ABSTRACT

A method is provided for reducing interferences in a wireless communication system. First, in one or more cells, a plurality of frequency-time frames are generated each having at least one predetermined frequency-time open window unused for desired wireless communications. The interference information is derived from the predetermined open windows of the frames. The interference for incoming signals is reduced by calculating beamforming weights using the observed interference information.

26 Claims, 7 Drawing Sheets

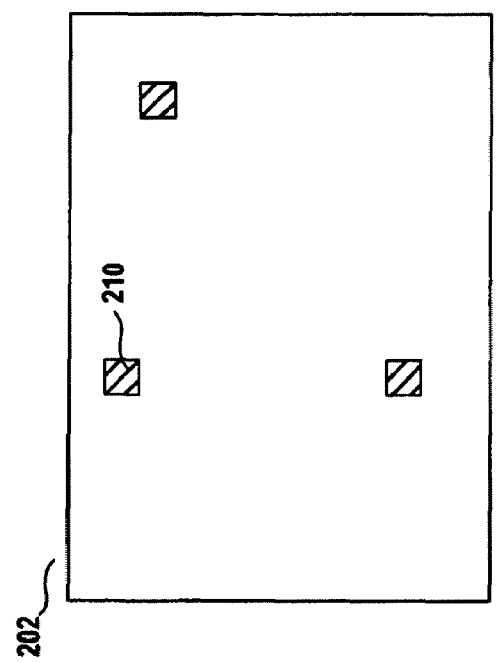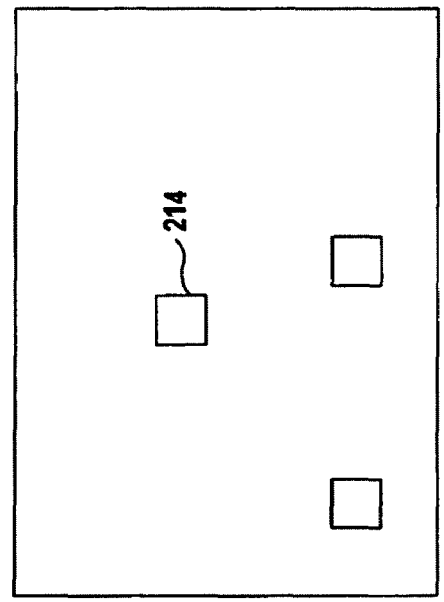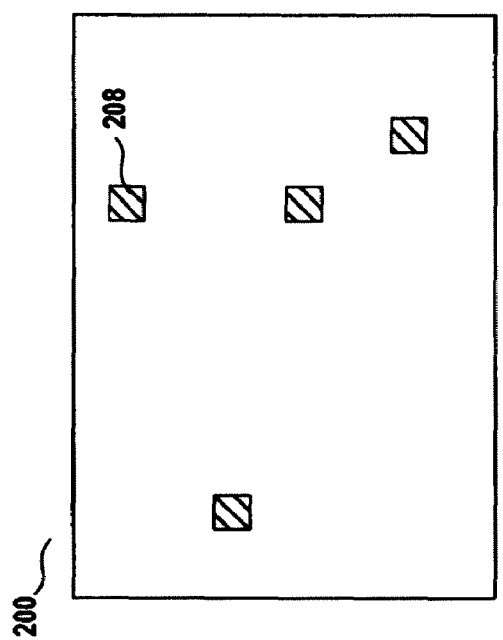

METHOD AND SYSTEM FOR COLLABORATED BEAMFORMING FOR REDUCING INTERFERENCE

CROSS REFERENCE

The present application claims the benefit of U.S. Provisional Application Ser. No. 60/727,661, which was filed on Oct. 18, 2005.

BACKGROUND

The present disclosure relates generally to wireless communication systems, and more particularly to a method for suppressing interference in adaptive beamforming.

Adaptive beamforming is a widely-used technique to achieve maximum capacity and coverage in wireless communication systems. Specifically, adaptive beamforming attempts to configure an away of antennas, in such a way that signals arriving from a desired direction at a specific frequency is detected and accepted while signals arriving from other directions at that specific frequency is rejected. The configuration mechanism typically includes iteratively computing a plurality of weights attributable to their corresponding antennas in the away of antennas to enhance the signal arriving from the desired direction while minimizing or eliminating the signal arriving from other directions. The desired direction is typically found by phasing the feed to each antenna of the away such that signals received or transmitted from all antennas of the away will be in phase in a particular direction.

On average, beamforming gain of 20 $\log_{10}(N)$ can be achieved for a downlink communication while a gain of 10 $\log_{10}(N)$ can be achieved for an uplink communication, wherein N is the number of antennas in the antenna array. Capacity increase in antenna array beamforming is mainly attributable to power increase, improvement of channel conditions, and suppression of interference. Power is increased by a factor of 2N in downlink communication, and by a factor of N in uplink communication. The direct power increase can be directly translated to a higher modulation order, thereby leading to a higher capacity. An antenna array improves the channel conditions significantly by optimized combination of multiple incoherent signals. Since the order of the modulation and coding rate depend on the channel conditions, better channel conditions means higher order modulation and low coding rate. Furthermore, good and stable channel conditions yield a more efficient link adaptation, thereby achieving a higher capacity. Finally, an antenna away allows the detection and suppression of multi-cell interference, which are critical in networks that require frequency reuse.

For example, modem communication networks are required to be compatible with a regular cellular network but also available to deliver at least 20 Mbps of data communication throughput per cell. The data throughput represents a 140-fold increase compared to the conventional voice rate of 14.4 kbps, assuming that the sustained data rate is 50 kbps, the average time for a voice call is 3 minutes and the average data time is 2 hours (50*60*2/(14.4*3)≈140). If a modulation order QAM16 is supported on average, the spectrum required per sector will be 5 MHz (20/4). If the network operator has 15 MHz spectrum available in total, the highest frequency reuse will be N=3. However, without a means to suppress same-channel interference, the deployment of frequency reuse (N=3) will yield poor system performance, because interference would render a poor signal-to-noise ratio in the majority of the area that even the more inferior QAM4 can support.

To suppress interference, a variation of adaptive beamforming is used. In null-steering beamforming, instead of enhancing the signal arriving from the desired direction, as given above, the direction in which the desired signal is not preferred is examined, and the output signal power pertaining to that direction is minimized.

However, beamforming calculation is a difficult task because interference occurs unpredictably. Traditional beamforming methods either require detecting interference in the entire frequency-time span of the wireless communication band, thereby yielding a good set of detection data but at a high capacity and processing cost, or detecting interference only in selected portions of the entire frequency-time span, thereby reducing the capacity and processing cost but losing overall data quality due to lack of a complete interference picture. There is currently no efficient method for efficiently detecting interference in a null-steering beamforming approach.

What is desired are methods that provide for more efficient detecting and suppressing of interference for optimizing antenna array capacity.

SUMMARY

In view of the foregoing, the following provides a method for detecting and suppressing interference for optimizing antenna array performance.

In one embodiment, a method is disclosed for reducing interferences in a wireless communication system. First, in one or more cells, a plurality of frequency-time frames are generated each having at least one predetermined frequency-time open window unused for desired wireless communications. The interference information is derived from the predetermined open windows of the frames. The interference for incoming signals is reduced by calculating beamforming weights using the observed interference information.

BRIEF DESCRIPTION OF THE DRAWINGS

FIG. 2A to 2D present four frequency-time frames in succession.

DESCRIPTION

The following provides a detailed description of a method and system for detecting and suppressing interference in null-steering beamforming according to various embodiments.

Figure 1:
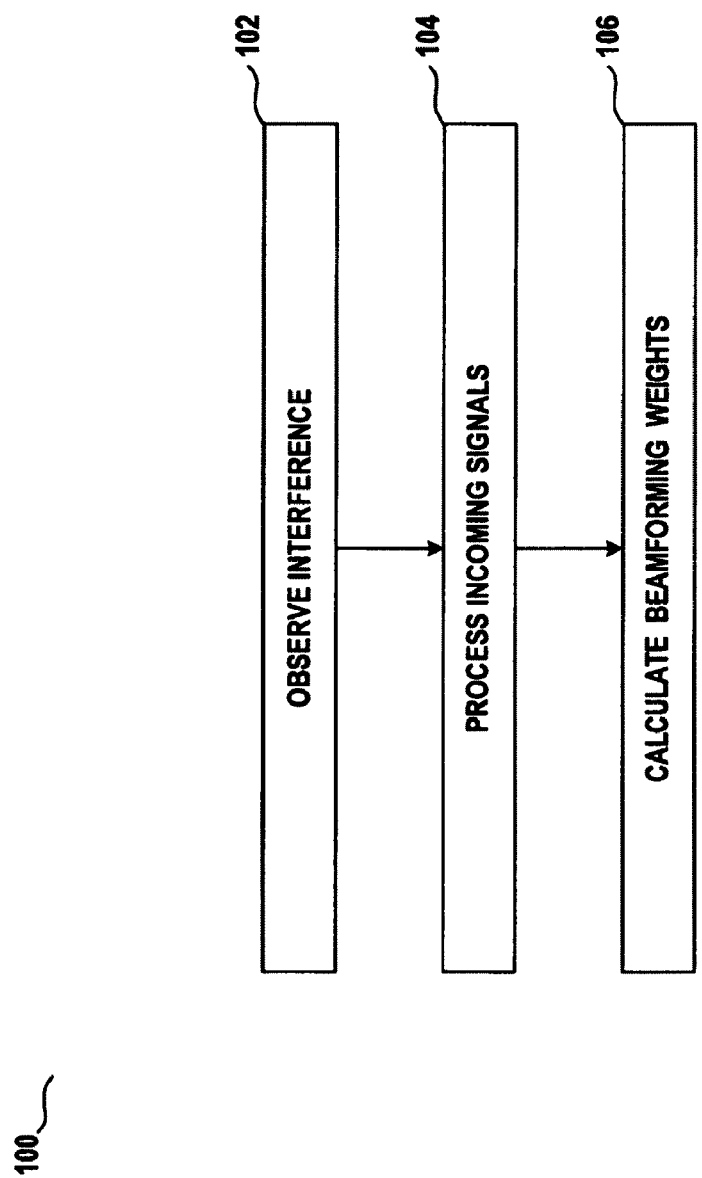
FIG. 1 presents a flow chart with steps for calculating beamforming weights in accordance with an embodiment.

FIG. 1 presents a flow chart 100 with steps for calculating beamforming weights in accordance with one embodiment of the invention. Three high level steps are: step 102 for observing interference, step 104 for processing incoming signals, and step 106 for calculating beamforming weights.

In step 102, interference is observed by first generating a set of un-used frequency-time windows in a frame during an uplink communication. A frame is a set of frequencies within a specific period of time, while a window is a portion or subset of the frame. For a base transceiver station (BS) in a cell, since an open window contains no transmission, any communication signals observed in that window is the result of interference from neighboring cells. By observing that interference, antenna weight(s) for appropriate beamforming may be calculated.

The size of the window is appropriately selected, and can be predetermined based on a number of selected factors, including historical frequency usages. Over a number of communication periods, the positions and the sizes of open windows, which are not used as a communication channel, in various frames can vary. In fact, they are specifically designed to vary from one frame to another with as little overlap as possible in order to cover the maximum amount of the entire frequency-time span over a number of successive frames.

FIGS. 2A to 2D present four frequency-time frames 200, 202, 204, and 206 that are in succession of each other. For example, the frame 200 precedes the frame 202, and the frame 202 precedes the frame 204, etc. The horizontal and vertical directions depicted herein with regard to each frame represent time and frequency, respectively. As such, an area, or a window, in each frame represents a subset of frequencies and a subset period of time within the frame. The frames 200, 202, 204, and 206 include a plurality of open windows 208, 210, 212, and 214, respectively. As shown, the positions and the sizes of the open windows differ from one frame to another. When the data from the frames are aggregated together, an improved interference information is obtained better than one only relying on a single frame.

Figure 2E:
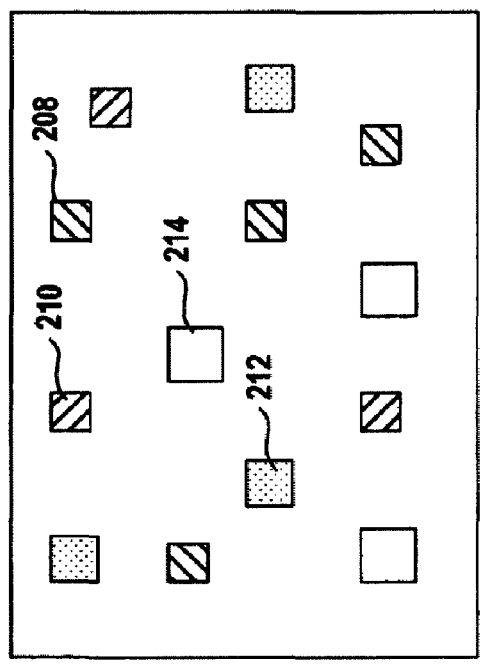
FIG. 2E presents a consolidated frequency-time frame.

FIG. 2E presents a consolidated frequency-time frame 220 aggregated from the frames 200, 202, 204, and 206. The frame 220 includes the plurality of open windows 208, 210, 212, and 214. By aggregating the four frames, interference signals can be analyzed in a consolidated frame while only a small processing overhead is required in each frame. The requirement to avoid adding too much processing overhead is critical because too much interference calculation in each frame will slow down the overall performance of the BS. While the amount of open window is small compared with the frame, which will minimize the capacity loss due to the opening windows, the aggregate of multiple frames can still capture a good picture of interference over a predetermined frequency-time span.

In actual implementation, positions and sizes of an open window may be determined by a pseudo-random sequence. Such open windows with time-varying positions and sizes in different frames may also be known as "flashing" windows. Furthermore, for a particular frame, a BS may choose a pattern of open windows that is different from those of other neighboring cells. For example, a set of 7 patterns may be assigned to 7 neighboring cells. Each pattern is available for reuse in a different frame but no cell selects a pattern that another has selected in the same frame. Over time, interference observation can be prioritized based on the frame receiving sequence by giving more consideration to the latest frames while giving less to earlier frames and dropping frames that have aged for a predetermined period of time.

Figure 3A:
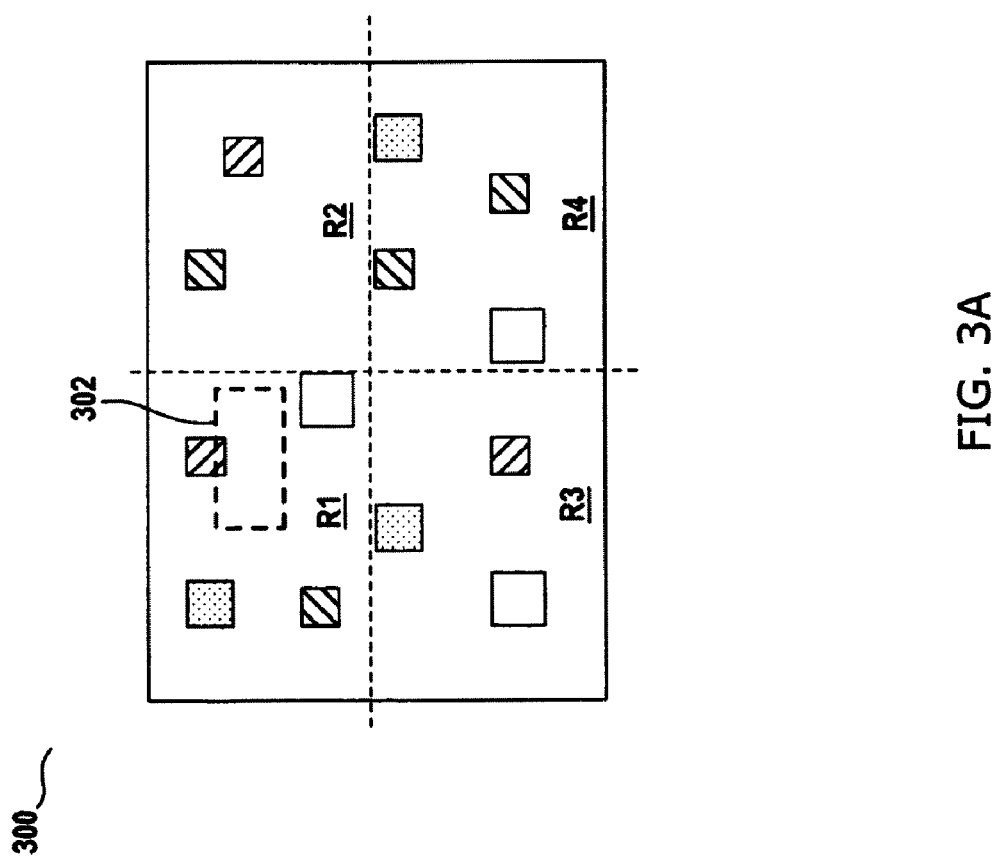
FIG. 3A presents a hard division method.

For optimized weight calculation, the frame may be divided into several regions. The interference information derived from a predetermined region enclosing the windows having similar time and frequencies is used for calculating the weights for the incoming signals. FIG. 3A presents a hard division method according to one embodiment of the present invention whereby a frame 300 is divided into four regions R1, R2, R3, and R4. If a desired uplink signal is located in an area 302, the optimized weight should be calculated with the uplink traffic and the interference observed in region R1.

Figure 3B:
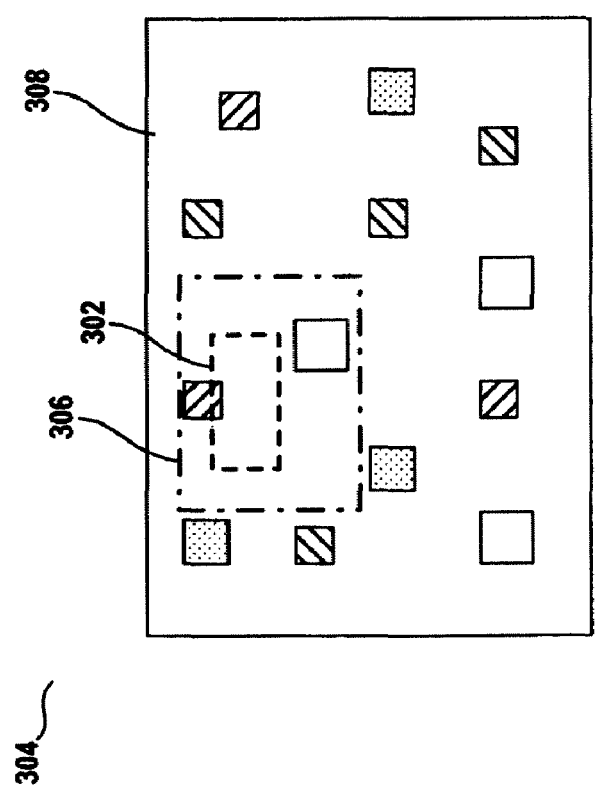
FIG. 3B presents a soft division method.

Alternatively, optimized weight can be calculated by dividing the frame according to the rough proximity of the uplink traffic. In FIG. 3B, for example, a soft division method is provided whereby a frame 304 is dynamically divided into two main regions: a region 306 and a region 308 encompassing the rest of the frame. The region 306 includes the area 302 which includes the desired uplink signals: The optimized weight should be calculated with the uplink traffic located in an area 302 and the interference observed in region 306. The boundary of this region 306 can vary dynamically as determined by the base station.

There are several ways to implement a succession of open windows according to the standards defined and referred to as IEEE 802.16, which is better known as WiMAX. As an example, a portion of the uplink region is relocated such that no connection identifier (CID) is assigned thereto. That relocated portion of the uplink region, unused, is then used as open windows for interference observation. Different unused uplink regions are allocated to different cells, and the allocation is changed from frame to frame to ensure a broad coverage of interference observation.

In one example in WiMAX, an uplink sounding region may be used as the unused region for interference observation. An uplink sounding region is allocated but no actual CID is allocated for the sounding region. The unused uplink sounding region can be different for different cells and their locations can be changed over time.

In another example, a safety zone mechanism is used to observe interferences. One or multiple safety zones are allocated within the frame where no uplink signals from the serving BS are present. Thus the interferences from neighboring cells will be observed in the safety zones.

In another example, a zone switch mechanism is used to observe interference. If there are $\Delta N$ symbols between two usable zones, wherein $\Delta N \geq 1$, a zone having $\Delta N$ symbols is created whereby if no CID is assigned thereto, it may be used as open windows for interference observation. Again, unused zones can be different for each cell, and their locations can be changed over time.

In yet another example, certain WiMAX carriers are not used for carrying actual traffic but earmarked for interference observations. The carrier earmarked for interference observation may be different for different cells and may vary over time. By having different patterns of open windows over time, BSs can capture interference in the entire uplink frame over a predetermined period without creating a large interference observation overhead.

In yet another example, in each cell, certain regions in the uplink frame may be designated as the safety zone according to IEEE 802.16 standard where no uplink transmissions occur from the cell's own terminals. The safety zone then can be served as the open window for neighboring cell interference observations.

Now referring back to FIG. 1, after interference is observed, the interference data are then processed in step 104. The processing of interference data can be at the base station or at an auxiliary device attached to the base station. The processing of interference data can also be a shared responsibility among multiple base stations, or at a base station controller (BSC) to which multiple base stations connect. Furthermore, the information on the observed interferences can be shared among multiple base stations through connectivity among base stations.

In an example, connectivity among multiple base stations may be achievable by directly connecting one base station to another base station via a physical link, e.g. Ethernet, T1, E1, etc. In another example, connectivity among multiple base stations may be achievable by connecting one base station to another base station via wireless links, including 802.11b, WiMAX etc. In yet another example, connectivity among multiple base stations may be achievable by connecting one base station to another base station through an intermediate network, such as an IP network. The processing of interference data may include placing interference data in an interference table, which records the inference level observed, and at which carriers and what time the interferences are observed. The interference table may be shared among multiple base stations through a centralized storage mechanism, or through a decentralized distribution mechanism.

Finally, the interference data in the interference table is used to calculate beamforming weights to improve system performance. When calculating optimized beamforming weights for interference nulling, the base station needs to know whether there is interference present at the same frequencies and at the same time as those of the desired signals. This information can be obtained by looking up the interference table. If there is an interference, a beamforming weight is calculated in such a way that the effect of the interferences will be minimized.

If resource allocations for uplinks and downlinks are not symmetrical, an additional step may be required to calculate downlink beamforming weights. To calculate downlink beamforming weights, the base station first uses uplink interference data available as collected and any spatial signatures that are generated considering the interference. Spatial signature is a set of the magnitude and phase of the received signal on the antenna array. The downlink beamforming weights are then calculated by considering the uplink and downlink resource allocations of neighboring cells for the current frame, as well as the downlink resource allocation for its own cell for the current frame. The resource allocations of the neighboring cells can be coordinated through existing connectivity among the base stations. For example, in a N=3 frequency reuse scheme, each base station will have at least nine data entries: a set of three frequency bands, a set of three interference levels observed for the three frequency bands, and a set of three spatial signatures.

Figure 4:
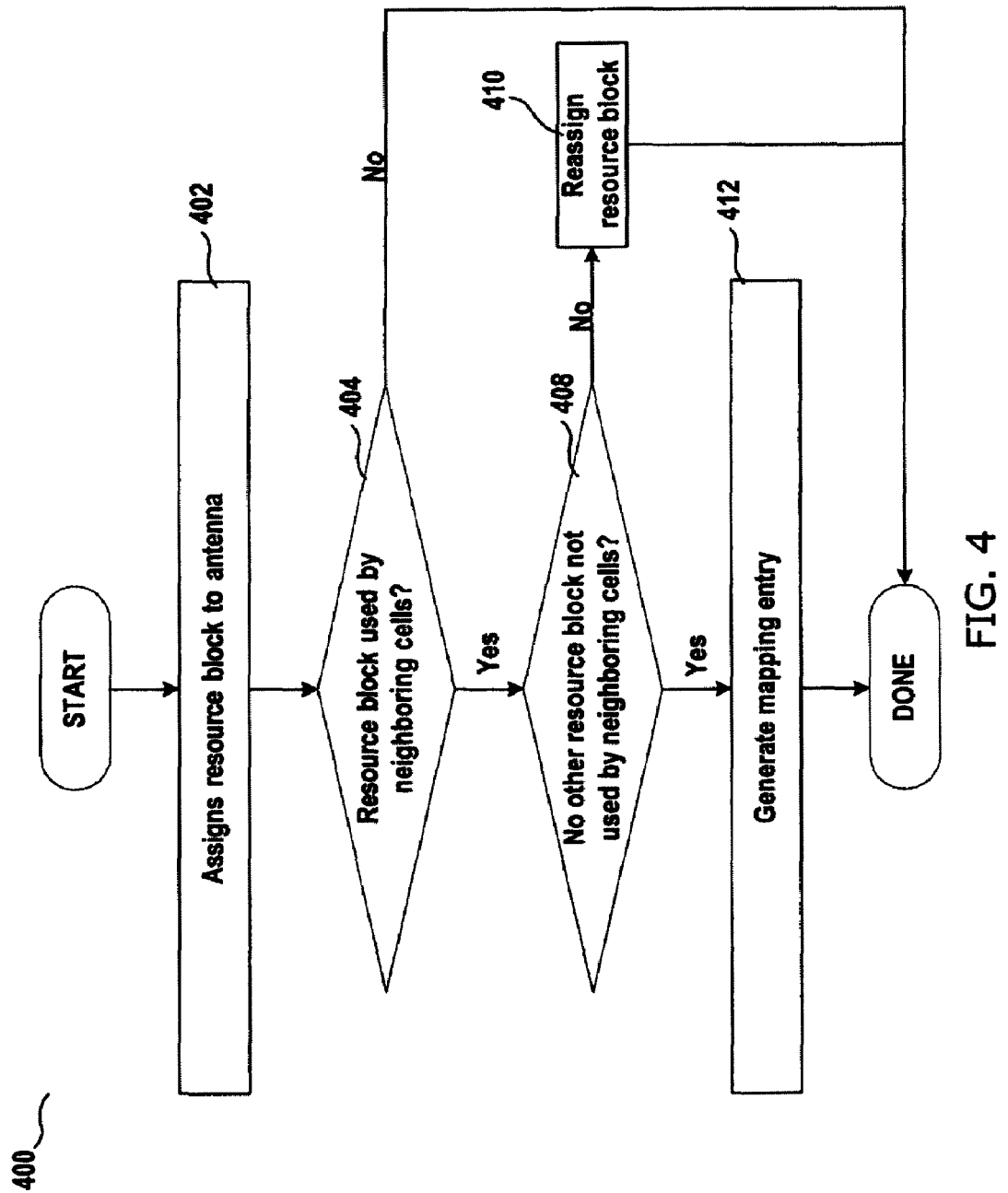
FIG. 4 presents a flow chart for generating a mapping entry for beamforming calculation.

FIG. 4 presents a flow chart 400 for generating a mapping entry for beamforming calculation according to one embodiment of the present invention. After a base station assigns a resource block, which is a subset of the carriers and a subset of the time within a frame, to be used to one of its terminals in step 402, the base station will check the interference table assembled in previous process in step 404 to see if there is any neighboring cell that will have an interfering terminal using a similar resource block. If there is indeed a neighboring cell that has an interfering terminal, the current base station will first attempt to reallocate another resource block to the antenna. If the decision box 408 returns that there are other resource blocks that are not assigned by any of the other neighboring cells, the antenna will be reassigned with a new resource block in step 410. If there is no other resource block available, the interfering terminal's spatial signature and the interference observed will be used for optimizing beamforming calculation and a mapping entry is generated at 412.

If the same resource block is already allocated to two or more interfering terminals in neighboring cells, the interference observed will be the total effective interference resulting from multiple terminals. If the two interfering terminals belong to the same neighboring cell, the observable region is further divided into sub-regions such that only one interfering terminal exists in each sub-region. In another scenario, if the two interfering terminals are from different neighboring cells, a direction of arrival analysis is performed to provide multiple mapping entries for proper beamforming calculation.

Figure 5:
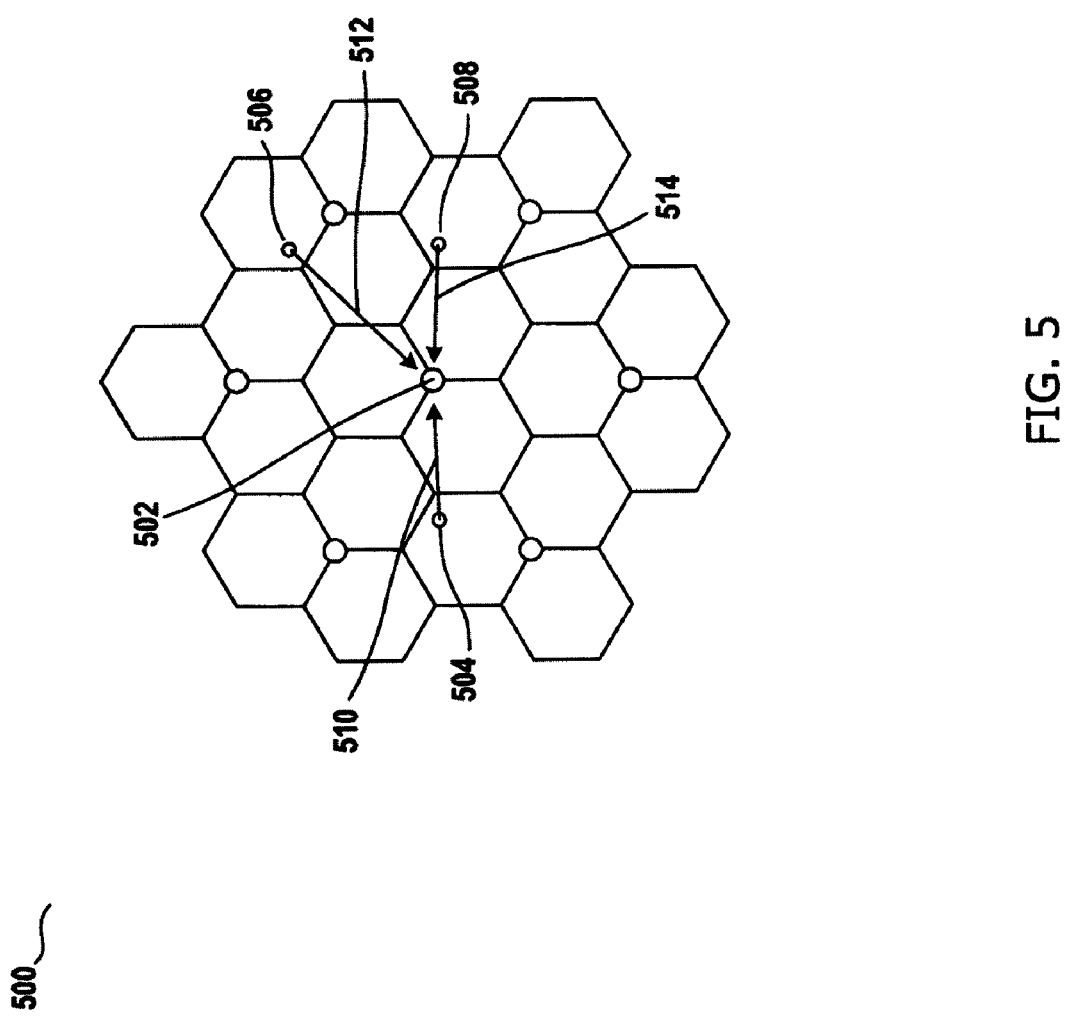
FIG. 5 presents a multi-cell interference scenario.

As shown in FIG. 5, a multi-cell interference scenario 500 is presented. In the scenario 500, a base station 502 is affected by three interference sources 504, 506, and 508 that occupy the same frequency band at the same time. A direction of arrival analysis is performed to separate interference paths 510, 512, and 514 so that three separate mapping entries may be entered for null steering beamforming calculation.

The foregoing provides many different embodiments or embodiments for implementing different features. Specific embodiments of components and processes are described to help clarify the subject matter described herein. These are, of course, merely embodiments and are not intended to be limiting.

Accordingly, it is appropriate that the appended claims be construed broadly and in a manner consistent with the scope, as set forth in the following claims.

What is claimed is:

1. A method comprising:
   at a base station configured for wireless communication in a cell, receiving uplink communications arranged in a plurality of frequency-time frames, each frame having at least one predetermined frequency-time open window that is unused for desired wireless communications, wherein a size and position of the at least one predetermined frequency-time open window are varied across the plurality of frequency-time frames for an uplink communication;
   observing received signals occurring at the one or more predetermined open windows of the frames;
   determining existence of interference based on the presence of received signals at the predetermined open window of the frames and generating interference information based on the received signals at the predetermined open window; and
   calculating beamforming weights with respect to received desired signals using the interference information for reducing the interference with the desired signals.

2. The method of claim 1, wherein the frequency-time open window is a portion of an uplink sounding region according to the IEEE 802.16 standard with no connection identifier as signed thereto.

3. The method of claim 1, wherein the frequency-time open window is a plurality of symbols between two usable zones according to the IEEE 802.16 standard with no connection identifier as signed thereto.

4. The method of claim 1, wherein the frequency-time open window is a safety zone according to the IEEE 802.16 standard.

5. The method of claim 1, wherein the frequency-time open window is at least one carrier earmarked for interference observation according to the IEEE 802.16 standard 6. The method of claim 1, wherein receiving comprises receiving the plurality of frequency-time frames each having different patterns for the open windows contained therein base on a pseudo-random sequence.

7. The method of claim 1, wherein observing further includes prioritizing the frames based on a receiving sequence such that greater consideration is given to more recently received frames over frames aged more than a predetermined period of time.

8. The method of claim 1, wherein, at the base station, further comprising generating data that represents a division of each frame into frequency-time regions, and wherein calculating further includes calculating the beamforming weights using interference information derived from received signals at one or more open frequency-time windows that are within a predetermined region which also contains the desired signals.

9. The method of claim 8, wherein generating the data that represents the division comprises generating the data such that a boundary of the predetermined region varies dynamically across frames.

10. The method of claim 1, wherein determining further includes determining a spatial signature based on the desired signals and the interference information.

11. The method of claim 1, further comprising generating data for uplink and downlink resource allocations of one or more neighboring cells for the desired signals.

12. The method of claim 1, and further comprising storing data representing interference discovered in one or more predetermined frequency-time open windows, and sharing the stored data with at least one other base station associated with a neighboring cell.

13. The method of claim 12, and further comprising receiving from the at least one other base station data representing interference discovered in one or more frequency-time open windows observed by the at least one other base station, and wherein calculating is further based on the data received from the at least one other base station.

14. The method of claim 13, and further comprising determining when interference from two or more terminals occurs in a frequency-time window of the same neighboring cell, and generating data that divides the frequency-time window containing the interference from the two more terminals into sub-regions such that the interference from only a single terminal exists in each sub-region.

15. A method comprising:
at a base station configured for wireless communication in a cell, receiving uplink communications arranged in a plurality of frequency-time frames, each frame having one or more predetermined frequency-time open windows unused for desired wireless communications, wherein a size and position of the at least one predetermined frequency-time open window are varied across the plurality of frequency-time frames for an uplink communication;
observing interference with respect to desired signals based on received signals during the predetermined open windows of the frames unused for the desired wireless communications; and
determining beamforming weights based on the observed interference for reducing the interference with respect to the desired signals,
wherein the frequency-time open windows are arranged in a pattern that is different in the cell from patterns used by a base station operating at least one neighboring cell.

16. The method of claim 15, wherein the frequency-time open window is a portion of an uplink sounding region according to the IEEE 802.16 standard with no connection identifier as signed thereto.

17. The method of claim 15, wherein the frequency-time open window is a plurality of symbols between two usable zones according to the IEEE 802.16 standard with no connection identifier as signed thereto.

18. The method of claim 15, wherein the frequency-time open window is at least one carrier earmarked for interference observation according to the IEEE 802.16 standard.

19. The method of claim 15, wherein the frequency-time open window is a safety zone according to the IEEE 802.16 standard.

20. The method of claim 15, wherein receiving comprises receiving the frequency-time frames each having different patterns from the open windows contained therein based on a pseudo-random sequence.

21. The method of claim 15, wherein observing further includes prioritizing the frames based on a receiving sequence such that greater consideration is given to more recently received frames over frames aged more than a predetermined period of time.

22. The method of claim 15, wherein, at the base station, further comprising generating data that represents a division of each frame into frequency-time regions, and wherein calculating further includes calculating the beamforming weights using interference information derived from received signals at one or more open windows that are within a predetermined region which also contains the desired signals.

23. The method of claim 22, wherein generating data that represents the division comprises generating the data such that a boundary of the predetermined region varies dynamically across received frames.

24. The method of claim 15, and further comprising storing data representing interference discovered in one or more predetermined frequency-time open windows, and sharing the stored data with at least one other base station associated with a neighboring cell.

25. The method of claim 24, and further comprising receiving from the at least one other base station data representing interference discovered in one or more frequency-time open windows observed by the at least one other base station, and wherein calculating is further based on the data received from the at least one other base station.

26. The method of claim 25, and further comprising determining when interference from two or more terminals occurs in a frequency-time window of the same neighboring cell, and generating data that divides the frequency-time window containing the interference from the two more terminals into sub-regions such that the interference from only a single terminal exists in each sub-region.

* * * * *